United States Patent [19]

Kirchhoff

[11] Patent Number: 4,991,403
[45] Date of Patent: Feb. 12, 1991

[54] PROCESS AND DEVICE FOR THE FREEZING OF BAKED GOODS

[76] Inventor: Ernst Kirchhoff, Buchfinkenweg 1, D-3050 Wunstorf, Fed. Rep. of Germany

[21] Appl. No.: 460,145
[22] PCT Filed: Oct. 6, 1987
[86] PCT No.: PCT/EP87/00576
§ 371 Date: Apr. 26, 1989
§ 102(e) Date: Apr. 26, 1989
[87] PCT Pub. No.: WO88/02988
PCT Pub. Date: May 5, 1988

[30] Foreign Application Priority Data

Oct. 28, 1986 [DE] Fed. Rep. of Germany ....... 3636713
Apr. 2, 1987 [DE] Fed. Rep. of Germany ....... 3711117

[51] Int. Cl.$^5$ ................................................ F24F 3/16
[52] U.S. Cl. ......................................... 62/78; 426/524
[58] Field of Search ...................... 62/457.2, 464, 459, 62/62, 64, 78; 426/112, 124, 128, 418, 506, 524

[56] References Cited

U.S. PATENT DOCUMENTS

| | | | |
|---|---|---|---|
| 2,210,946 | 8/1940 | Moore | 62/457.2 |
| 2,763,134 | 9/1956 | McDonald | 62/459 |
| 3,236,206 | 2/1966 | Willinger | 62/457.2 |
| 3,627,393 | 12/1971 | Hickson et al. | 426/418 |
| 4,265,095 | 5/1981 | McConachie | 62/465 |
| 4,303,687 | 12/1981 | Ratjen | 426/524 |

*Primary Examiner*—Ronald C. Capossela
*Attorney, Agent, or Firm*—Felfe & Lynch

[57] ABSTRACT

For the freezing of baked goods, one exposes the baked goods, at least during the freezing procedure, to an atmosphere of increased atmospheric humidity. For the carrying out of this process, there is preferably used a container for the freezing of baked goods, the inner chamber of which consists of 2 parts which are separated from one another by a water vapor-permeable wall, whereby in the one part are present the baked goods and in the other part an aqueous solution which contains an agent lowering the freezing point.

3 Claims, 1 Drawing Sheet

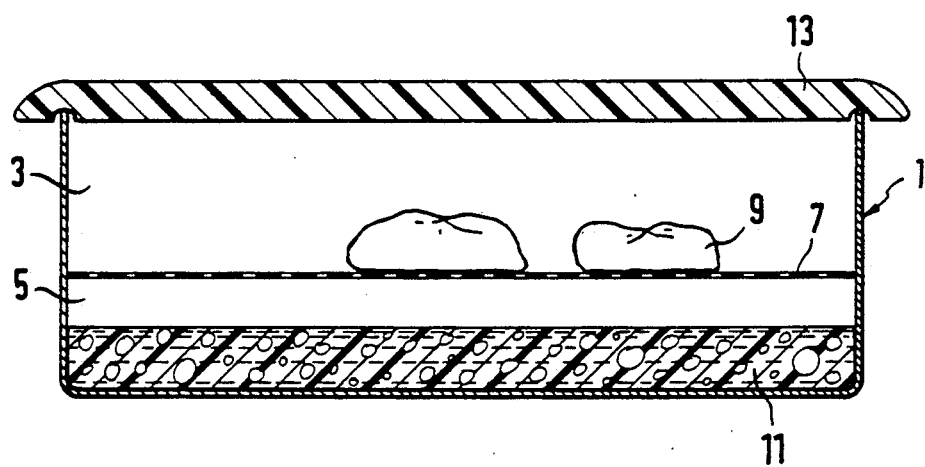

PROCESS AND DEVICE FOR THE FREEZING OF BAKED GOODS

The invention concerns a process and a device for the freezing of baked goods.

The quality of baked goods, such as bread, rolls, cakes and biscuits, as well as of pre-prepared dough and semi-baked goods, changes very quickly in the case of storage. The crust loses crispness, the centre becomes tough and the crumb structure changes. Succulence and elasticity of the baked goods are thereby lost. This behaviour, referred to as becoming stale baked goods, depends, in the first place, upon the retrogradation of the starch. For this reason, baked goods cannot be kept very long and must be sold in a fresh state. In order to make possible a storage of the baked goods, it has already been attempted to freeze the fresh baked goods and then again to produce the fresh state by rebaking. However, this is only successful to a limited extent. During the freezing and the storage in a deep-cooled state, the goods lose moisture which leads to a drying out of the crust and, in the case of the rebaking, can bring about a dissolving of the crust. In order to compensate the moisture loss during the freezing and during the storage, it has already been suggested to supply water to the baked goods by injection of saturated steam into the centre. However, it is a disadvantage of this known process that the crust, the surface of which is exposed to the surroundings, loses moisture whereas the centre becomes sticky due to the introduced moisture.

Therefore, it was the task of the present invention to avoid the disadvantages of the known process and to make available a process and a device which makes it possible so to freeze baked goods that a loss of quality practically does not occur and which then, in a rebaked state, are comparable with freshly baked baked goods. Furthermore, it was the task of the invention to make available a container in the case of which, for the use, each time only water has to be replenished, as well as to make available an agent with which the necessary aqueous solution for each container shape can easily be prepared.

This task is solved by a process for the freezing of baked goods which is characterised in that one exposes the baked goods during the freezing to an atmosphere of increased atmospheric humidity.

Surprisingly, it was found that baked goods can be stored deep cooled over a comparatively long period of time practically without loss of quality when, at least during the freezing procedure, the atmosphere which surrounds the baked goods has an increased atmospheric humidity. The crumbs can then not lose any moisture during the freezing and the original state which was present before the freezing is maintained.

The process according to the invention is suitable not only for finished baked goods but also for pre-prepared dough or pre-baked semi-baked goods. All these products are to be understood under the term baked goods here used.

For the freezing, the baked goods are exposed to an atmosphere of increased atmospheric humidity. The atmospheric humidity is thereby increased with regard to the normal atmospheric humidity but not so greatly that the crust outwardly becomes moist or wet. The atmospheric humidity should be so adjusted that, in the case of freezing, no frost is formed on the baked goods. The correct atmospheric humidity for the particular baked goods can easily be ascertained in a few experiments. As a rule, it is preferred that the atmospheric humidity in the case of freezing amounts to about 80 to 95%.

In order to maintain an increased atmospheric humidity during the freezing procedure, it is preferred to carry out the freezing in a closed container. The increased atmospheric humidity is then produced in that, at least during the freezing procedure, an aqueous solution is present which contains an agent lowering the freezing point. This aqueous solution, the freezing point of which lies below 0 and can be lowered to below $-18°$ C., can still evaporate water even when the freezing point of pure water is gone below. Thus, this solution gives off water to the atmosphere even during the freezing procedure and possibly also even during the storage. In the most favoured case, the atmospheric humidity is so adjusted that it is in equilibrium with the baked goods and the baked goods neither take up moisture nor give off moisture.

It is especially favourable to place the baked goods in the container in still oven-warm state and then to freeze since moisture is lost even in the case of cooling.

As aqueous solution for the increasing of the atmospheric humidity, an aqueous solution is preferably used which contains 2 to 30, preferably 5 to 15 wt.% of salt, and/or sugar, referred to water. Such a solution contains no component materials hazardous to health and the freezing point is lowered to a sufficient extent by the addition of salt and/or sugar.

In a preferred embodimental form, the aqueous solution can also additionally contain an aroma material, such as lemon or vanilla aroma. With the take-up of moisture, the baked goods then simultaneously take up this aroma material. In this way, aroma materials which have escaped during the baking can again be introduced at least partly in the case of the freezing or the baked goods can be aromatised even after the baking.

Furthermore, the subject of the invention is a container for the freezing of baked goods which is characterised in that the inner chamber consists of two parts which are separated from one another by a water vapour-permeable wall, whereby in one part is present the baked goods and in the other part an aqueous solution which contains an agent lowering the freezing point.

The container according to the invention is suitable for the carrying out of the process according to the invention. This container makes it possible to freeze baked goods in a simple way with simple means without a substantial reduction of quality taking place. At the same time, it can also be used as transport means for the frozen baked goods.

The container according to the invention is preferable closeable, especially preferably air-tight closeable.

In a preferred embodimental form, the container according to the invention has an inner chamber which consists of an upper and a lower part which are separated from one another by an air- and water vapour-permeable support on which the baked goods can be laid, whereby in the lower part is present an aqueous solution which contains an agent lowering the freezing point.

The container according to the invention has a shape and size which is adapted to the baked goods in question. Thus, for example, the container can have the size of a standardised baking plate so that griddle cakes can be placed in the container and, for defrosting, can then again be taken out and rebaked. It is also possible to allow the baked goods to defrost in the container according to the invention and only then to remove them. A rebaking is then often no longer necessary.

If a closeable container is used, then the cover of the container preferably consists of insulating material, such as e.g. Thermopen. The inner side of the cover then does not cool down so quickly as the remaining container. Since the moist air ascends in the container and the moisture deposits inside on the cover, it is favourable when the inner side of the cover is still not so cold that the water freezes immediately and is thus removed from the system. In order to prevent the freezing of the water during the freezing procedure, it is also possible to make the cover heatable. The temperature should then be so adjusted that it is maintained at approximately a temperature difference of 5° C., i.e. that the cover is always about 5° C. warmer than the surroundings during the freezing procedure.

If the freezing takes place in open containers in a cold room, then between the individual containers are then preferably arranged evaporator plates which consist of insulating material and are preferably heatable.

In a further embodimental form, the container is constructed as froster. The container is then itself provided with cooling aggregates and can be used directly for the freezing.

The inner chamber of the container according to the invention is divided into two regions by a water vapour-permeable wall. This wall is preferably used as support for the goods to be frozen and is then mechanically so stable that it can bear the goods to be frozen to be laid thereon. As support, there is preferably used a grid.

In the one part of the container which is bounded by the water vapour-permeable wall, there is present an aqueous solution which contains an agent lowering the freezing point. As agent lowering the freezing point, there is thereby preferably used salt and/or sugar.

In order to simplify the handling of the container according to the invention, the part of the container which is to receive the aqueous solution containing an agent lowering the freezing point preferably contains an absorbent material. As absorbent material there should thereby be used a material which is not hazardous to health. Filter paper or a sponge is especially suitable. In a preferred embodimental form, the device is already provided with filter paper or a sponge which is impregnated with a solution which contains an agent lowering the freezing point. Since, in the case of the use of the device, only water is lost due to evaporation, for regeneration only water has to be made up in such an amount that the filter paper or the sponge is moist. The device can then again be used for the freezing. Therefore, the container according to the invention permits, with technically simple means, the carrying out of the freezing of baked goods.

Therefore, especially preferably, in to the lower part of the container is laid an absorbent material which is impregnated with an aqueous solution which contains an agent lowering the freezing point. The advantage of this embodimental form is that, in the case of use, only water has to be poured in. The absorbent material made available according to the invention then provides the necessary agent lowering the freezing point. Therefore, in the case of use, only the absorbent material is laid in, water is poured in and the container according to the invention is ready for the reception and for the freezing of the baked goods.

For the freezing, in the one part of the container is introduced the solution which contains the agent lowering the freezing point. In the other part, the baked goods are then laid in and the container possibly closed. During the freezing procedure, the atmosphere in the container enriches with moisture from the aqueous solution which is present in the one part. No moisture is thereby removed from the surface of the baked goods. Such treated baked goods can be stored over a comparatively long period of time without substantial quality loss in the deep frozen state. When required, the baked goods are removed from the container and rebaked in per se known manner. Thereafter, after the addition of water, the container can be used again.

Furthermore, according to the invention, there is made available an absorbent material which is characterised in that it is impregnated with a solution containing an agent lowering the freezing point or a mixture of agents lowering the freezing point.

As absorbent material, every material is suitable which easily takes up liquid and can give it off again. For this purpose, there is preferably used a fibre fleece, a sponge or a filter paper. This absorbent material is then impregnated with the appropriate solution.

As impregnation solution, there is preferably used a solution which contains sugar and/or salt. Especially preferably, a solution is used which contains 2 to 15 wt.% of salt and/or sugar. Subsequently, the absorbent material is dried. The so produced absorbent material can very easily be cut up into any desired size. Thus, it can be adapted to the particular container shape.

The absorbent material can, possibly after drying, be used again several times. However, for hygienic reasons, it should be changed often.

According to the invention, a process and a device are made available which permit the freezing of baked goods in a simple way and, in spite of storage, lead to high quality products.

In the accompanying drawing is shown a preferred embodimental form of the device according to the invention.

FIG. 1 shows a cross-section through a container according to the invention.

The container 1 is divided in its inner chamber into an upper part 3 and a lower part 5. The upper part 3 and the lower part 5 are separated from one another by an air- and water vapour-permeable support 7. In the upper part 3 of the container are present the baked goods 9 to be frozen. In the lower part 5 is present a sponge 11 which is fully impregnated with an aqueous solution containing an agent lowering the freezing point. On the container 1 is present a cover 13 which consists of Thermopen. The cover 13 closes the container 1 airtight.

I claim:

1. Process for the freezing of baked goods, comprising increasing atmospheric humidity of an atmosphere surrounding baked goods with regard to normal atmospheric humidity, and exposing unfrozen baked goods, at least during the freezing process, to the atmosphere of increased atmospheric humidity and to a freezing temperature of the baked goods.

2. Process according to claim 1, in which the step of exposing the baked goods to a freezing temperature of the baked goods comprises freezing the baked goods in the presence of an aqueous solution which contains an agent lowering the freezing point of the aqueous solution.

3. Process according to claim 1, in which the step of exposing the baked goods to a freezing temperature of the baked goods comprises freezing the baked goods in the presence of a 2 to 30 wt.% solution of at least one of salt and sugar in water.

* * * * *